United States Patent [19]

Suzuki

[11] Patent Number: 4,861,138

[45] Date of Patent: Aug. 29, 1989

[54] DEVICE FOR DRIVING OPTICAL PARTS OF AN OPTICAL PICKUP

[75] Inventor: Jun Suzuki, Saitama, Japan

[73] Assignee: Pioneer Electronic Corporation, Tokyo, Japan

[21] Appl. No.: 179,802

[22] Filed: Apr. 11, 1988

[30] Foreign Application Priority Data

Apr. 17, 1987 [JP] Japan ................................. 62-94711

[51] Int. Cl.⁴ .............................................. G02B 7/02
[52] U.S. Cl. .................................... 350/255; 350/247; 369/45
[58] Field of Search ................. 350/63, 484, 255, 247; 369/44, 45

[56] References Cited

U.S. PATENT DOCUMENTS 4,643,522 2/1987 Takashima .......................... 350/255
4,752,117 6/1988 Ichikawa et al. .................... 350/255

Primary Examiner—Bruce Y. Arnold
Assistant Examiner—J. P. Ryan
Attorney, Agent, or Firm—Sughrue, Mion, Zinn, Macpeak & Seas

[57] ABSTRACT

A device for driving optical parts of an optical pickup comprises a magnet having first and second magnetic pole surfaces, each of the first and second magnetic pole surfaces having adjacent different magnetic poles which generate a magnetic field that is disposed perpendicularly to the magnetic field of the other magnetic pole surface, and first and second coils which oppose corresponding first and second magnetic pole surfaces.

15 Claims, 4 Drawing Sheets

DEVICE FOR DRIVING OPTICAL PARTS OF AN OPTICAL PICKUP

BACKGROUND OF THE INVENTION

1. Field of the Invention

This invention relates to a device for driving optical parts of an optical pickup.

2. Background

An optical pickup reads information by way of irradiating a focused-information-reading laser beam onto a recording track formed in an information-recorded surface of a recording medium, and by detecting changes in the light beam reflected from the information-recorded surface. Therefore, the information reading laser beam needs to be focused at all times on the recording track, even if the surface of the recording medium deflects due to warping or the like. Therefore, the system is constituted in such a manner that focus servo control can be conducted when an objective lens, which acts to focus the laser beam, is slightly moved in a direction perpendicular to the information-recorded surface. Furthermore, since the laser beam must correctly and at all times follow the recording track, even if the recording track becomes eccentric, the system is constituted in such a manner that tracking servo control can also be conducted when the objective lens is slightly moved in the direction perpendicular to the recording track.

In order to realize the above-described movement of the objective lens, a device for driving a lens 1, shown in FIGS. 1 and 2, has been disclosed by the applicant of the present invention. In the device for driving a lens of the type described above, an objective lens 1 for irradiating a spot light beam onto a recording surface of a recording medium (omitted from the illustration) is, as shown in FIG. 1, fitted onto a holding member 2. The holding member 2 has a hollow portion 3 penetrating therethrough. In the hollow portion 3, a focusing coil 4 and two tracking coils 5 are fastened. The focusing coil 4 is secured in such a manner that the central axis thereof is parallel to the optical axis of the objective lens 1. The tracking coils 5 are attached to the outer surface of the focusing coil 4 in such a manner that the central axis of each tracking coil 5 is disposed perpendicular to the optical axis of the objective lens 1. The holding member 2, to which the focusing coil 4, tracking coils 5, and objective lens 1 are secured, is fitted to free ends of four cantilevered support members 6 which extend perpendicular to the direction of the optical axis of the objective lens 1. On the other hand, the fixed ends of the support members 6 are fastened to a base 7. Since the four support members 6 are flexible, the holding member 2 is able to move in the axial direction of the optical axis of the objective lens 1 (the direction designated by an arrow F) and in a direction perpendicular to the direction of the optical axis (the direction designated by an arrow T). This movement is with respect to the base 7.

A magnet 8 and a yoke 9 which generate a magnetic field that links the focusing coil 4 and the tracking coils 5 are inserted into the hollow portion 3 of the holding member 2 which is supported on the base 7 in such a manner that the holding member 2 is able to move in the above two directions with respect to the base 7. A magnetic circuit is formed by the magnet 8 and the yoke 9, which is preferably made of a ferromagnetic material. A single magnetic gap 10 which generates parallel flux is provided in the magnetic circuit formed by the magnet 8 and the yoke 9. The magnet 8 and the yoke 9 inserted into the hollow portion 3 are secured to a securing member (omitted from the illustration) which is secured to the base 7.

In the device for driving the lens, the structure of which is constituted as described above, the objective lens 1 with the holding membert 2 can be moved in the direction designated by the arrow F by supplying electric current to the focusing coil 4. On the other hand, the objective lens 1 with the holding member 2 can be moved in the direction designated by the arrow T by supplying electric current to the tracking coils 5.

SUMMARY OF THE INVENTION

An object of the present invention is to improve the above-described optical pickup, and to provide an optical pickup which is compact and lightweight.

In a device for driving optical parts of an optical pickup according to the present invention, a driving means drives the optical parts, the driving means comprising a magnet having first and second magnetic pole surfaces, each of the first and second magnetic pole surfaces having adjacent different magnetic poles which generate a magnetic field that is disposed perpendicularly to the magnetic field of the other magnetic pole surface, and first and second coils which oppose the corresponding first and second magnetic pole surfaces.

BRIEF DESCRIPTION OF THE DRAWINGS

FIG. 5 (*b*) is a cross-sectional view illustrating the layout of a magnet and coils, the view being taken along the line B—B of FIG. 5 (*a*);

FIG. 5 (*c*) is a cross-sectional view taken along the line C—C of FIG. 5 (*a*)

DESCRIPTION OF THE PREFERRED EMBODIMENT

Embodiments of the present invention will now be described with reference to FIGS. 3 to 6.

Figure 3:
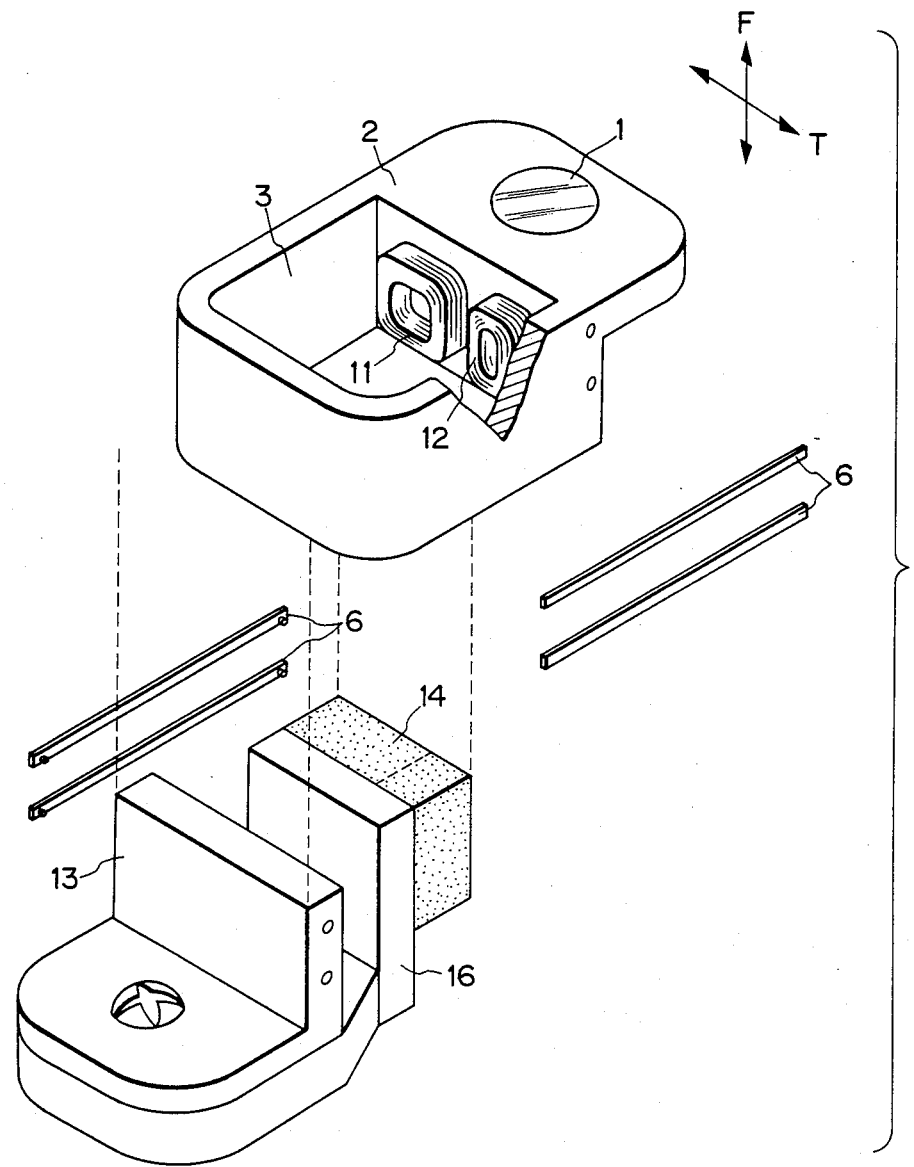
FIG. 3 is an exploded view of a device for driving optical parts according to the present invention.
Figure 4:
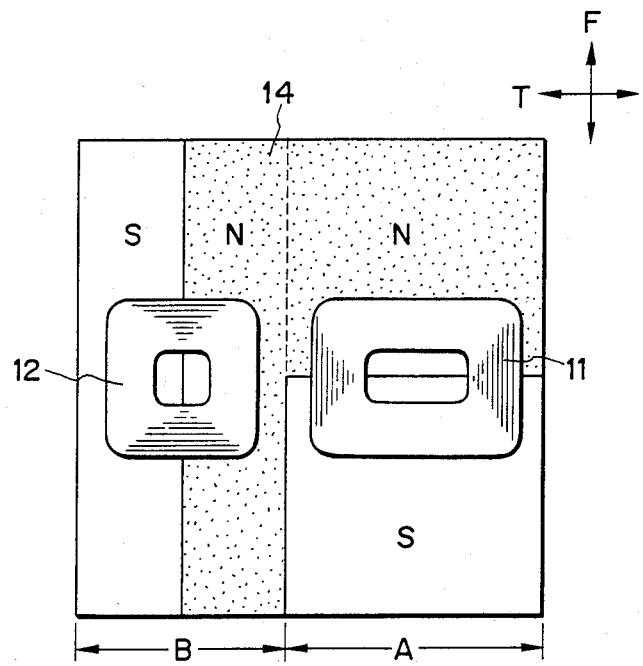
FIG. 4 illustrates the layout of the magnet and coils shown in FIG. 3.

Referring to FIGS. 3 and 4, in a device for driving optical parts according to the present invention, the holding member 2 which holds an objective lens 1 has a hollow portion 3 therein. In the hollow portion 3, a focusing coil 11 and a tracking coil 12, acting as a first coil and a second coil, respectively, are placed parallel to each other. The holding member 2, to which the objective lens 1, the focusing coil 11, and tracking coil 12 are secured, is fitted to the free ends of four cantilevered support members 6 extending in the direction perpendicular to the optical axis of the objective lens 1. The fixed ends of the support members 6 are secured to the base 13. Since the support members 6 are flexible, the holding member 2 is able to move with respect to a base 13 in the direction of the optical axis of the objective lens 1 (the direction designated by an arrow F) and in the direction perpendicular thereto (the direction designated by an arrow T).

A magnetic 14 which generates a magnet field linking the focusing coil 11 and tracking coil 12 is inserted into the hollow portion 3 of the holding member 2. The magnet 14 opposes the focusing coil 11 and the tracking coil 12 at a predetermined distance therefrom. As shown in FIG. 4, a surface of the magnet 14 opposes the two coils 11 and 12. In the portion of the surface of the magnet 14 opposing the focusing coil 11, a north pole and a south pole are disposed adjacent to each other in the direction of the optical axis of the objective lens 1 (the direction designated by the arrow F). As a result, a first magnetic polar surface A which generates a magnetic field in the direction of the optical axis is formed. On the other hand, in the portion opposing the tracking coil 12, a north pole and a south pole are disposed adjacent to each other in the direction perpendicular to the optical axis (the direction designated by the arrow T). As a result a second magnetic polar surface B is formed which generates a magnetic field in the direction perpendicular to the optical axis. The magnet 14 is supported by a support member 16 having a base 13 screwed thereto.

The positional relationship between the first magnetic polar surfaces A and B of the magnet 14, the focusing coil 11, and the tracking coil 12 will now be described. As shown in FIG. 4, the focusing coil 11 is disposed in such a manner that it extends over both the north pole and the south pole which form the first magnetic polar surface A. Similarly, the tracking coil 12 is disposed in such a manner that it extends over both the north pole and the south pole which form the second magnetic polar surface B.

In the device for driving optical parts according to the present invention, of which the structure has been described above, when an electric current is supplied to the focusing coil 11, an electromagnetic force is applied to the two portions of the focusing coil 11 in the direction of the optical axis of the objective lens, these two portions opposing the north pole and south pole, respectively. As a result of the thus-applied electromagnetic force, the objective lens 1 with the holding member 2 is moved in the direction of the optical axis of the objective lens 1. Similarly, when an electric current is supplied to the tracking coil 12, an electromagnetic force is applied to the tracking coil 12 in the direction perpendicular to the direction of the optical axis of the objective lens 1. As a result of the thus-applied electromagnetic force, the objective lens 1 with the holding member 2 is moved in the direction perpendicular to the optical axis.

The gap between the focusing coil 11 and the magnet 14 and between the tracking coil 12 and the magnet 14 is preferably as small as possible so as to ensure that the electromagnetic force is efficiently generated.

Figure 1:
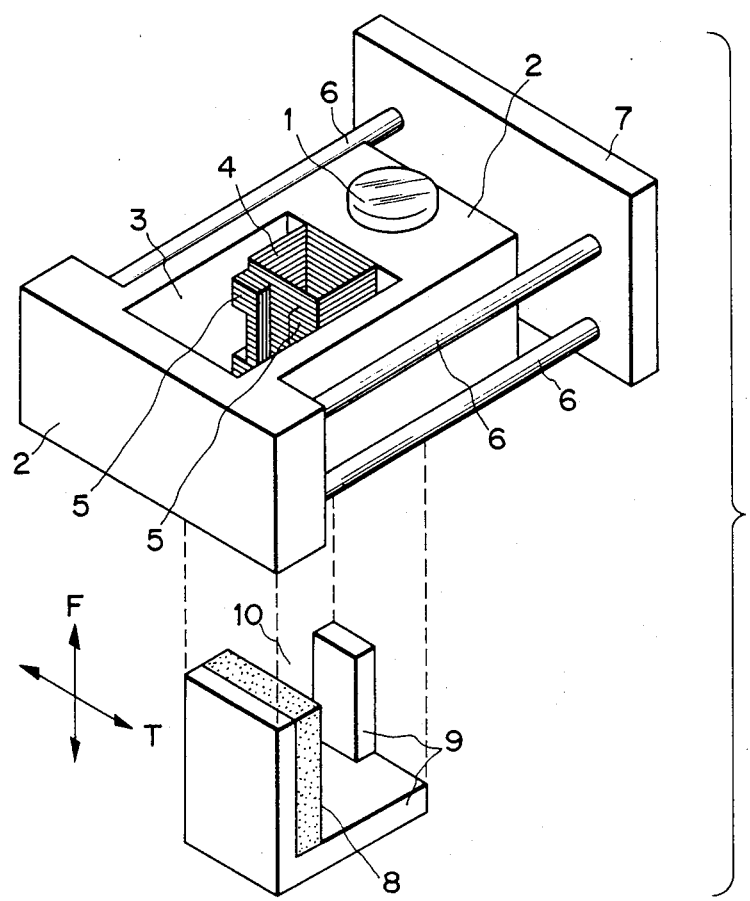
FIG. 1 is an exploded perspective view illustrating a conventional device for driving a lens.
Figure 2:
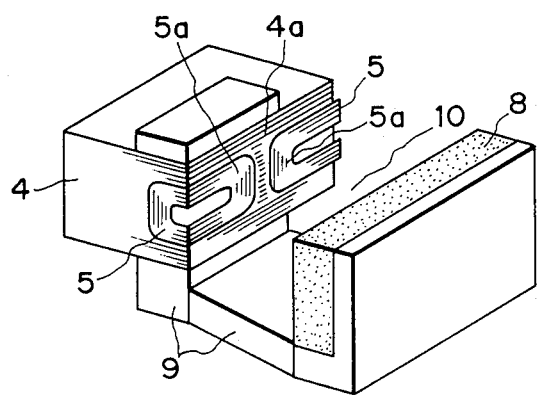
FIG. 2 is a perspective view of the corresponding magnetic circuit and coils of the conventional device of FIG. 1.
Figure 5A:
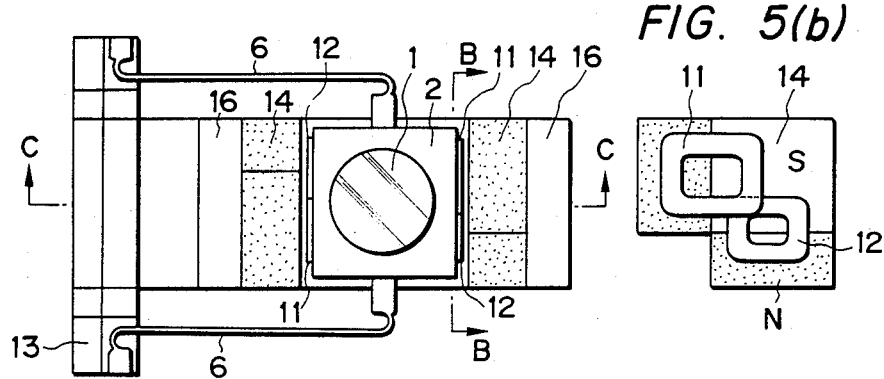
FIG. 5 illustrates a modified example of the embodiment of the present invention shown in FIG. 3; wherein FIG. 5 (*a*) is a plan view.
Figure 5B:
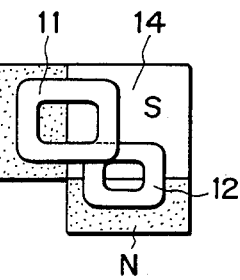
Figure 5C:
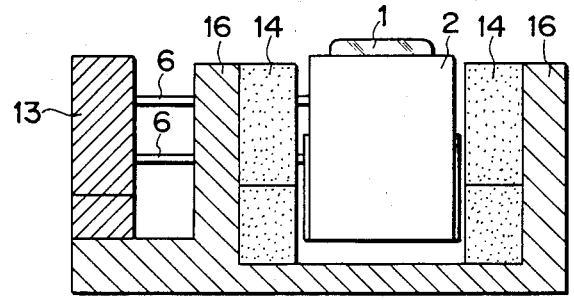

FIG. 5 illustrates a modification of the embodiment shown in FIG. 4, wherein two pairs of focusing coils 11 and the tracking coils 12 are disposed with respect to the holding member 2, and magnets 14 respectively oppose the two pairs of the coils. Since the operation of the device for driving optical parts is the same as that of the embodiment shown in FIGS. 1 and 2, a description of the same is omitted.

Figure 6:
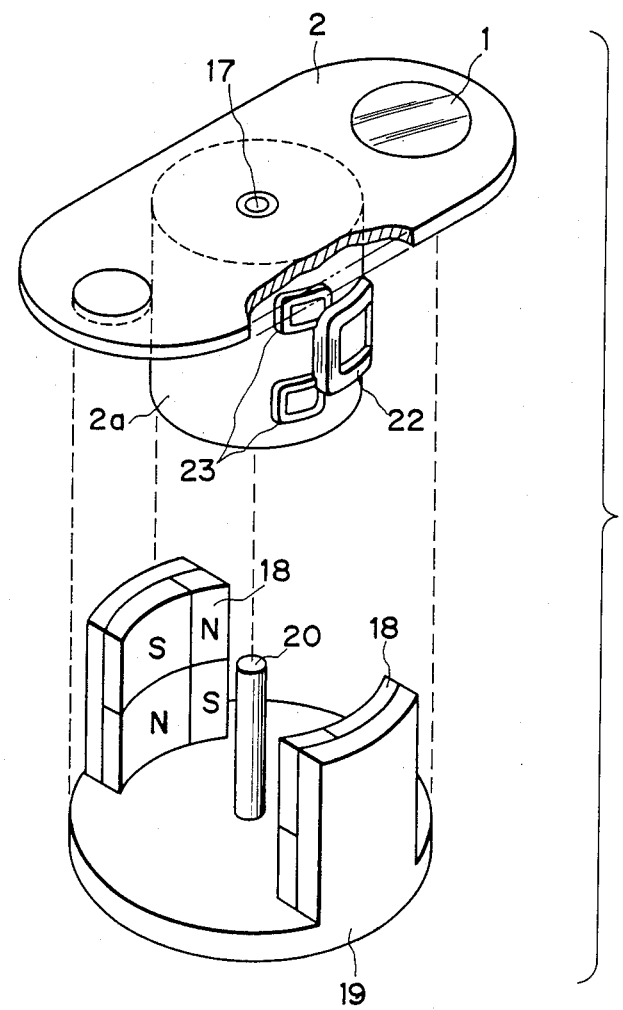
FIG. 6 is an exploded view illustrating another embodiment of the present invention.

Another embodimetn of the present invention is shown in FIG. 6. In this embodiment, a through hole 17 is formed at a substantially central portion of the holding member 2 which holds the objective lens 1. A support shaft 20, protruding in the direction of the optical axis of the objective lens 1 from a support member 19 that holds a magnet 18, is inserted into the through hole. As a result, the holding member 2 is supported in such a manner that it can be moved in the direction of the central axis of the support shaft 20 and in a circumferential direction relative to the central axis. A cylindrical portion 2a is formed around the through hole 17, and a focusing coil 22 and tracking coils 23 are secured to the outer surface thereof. Although their illustration is omitted, another focusing coil 22 and tracking coils 23 are secured to the opposite side of the cylindrical portion 2a.

The support member 19 holds the magnet 18 opposing the focusing coil 22 and the tracking coils 23 at a predetermined distance therefrom. In a portion of the surface of the magnet 18 opposing both the focusing coil 22 and the tracking coils 23, a first magnetic polar surface is formed in the portion opposing the focusing coil 22, and the magnetic polar surface generates a magnetic field in the direction of the optical axis of the objective lens 1. On the other hand, a second magnetic polar surface which generates a magnetic field in the direction perpendicular to the optical direction of the objective lens is formed in a portion opposing the tracking coils 23.

In the above-described device for driving optical parts, when an electric current is supplied to the focusing coil 22 and the tracking coils 23, electromagnetic forces are respectively applied thereto in the direction of the central axis of the support shaft 20 and in the circumferential direction relative to this central axis. As a result of the thus-applied electromagnetic force, the holding number 2 is moved so that the objective lens 1 is moved inthe direction of the optical axis of the objective lens 1 and in the direction perpendicular to the same.

In the above-described embodiments, although the objective lens 1 is the only optical part held by the holding member 2, a light-emitting device, a light-receiving device, a diffraction grating device, a cylindrical lens, or a beam splitter can be employed as the optical part. Any one of the above described parts, a plurality of the same, or all of the same may be held by the holding member 2, and they may be moved for the purpose of conducting focusing servo or tracking servo control.

As described above, in the device for driving optical parts according to the present invention, a structure is employed in which the optical parts are driven by driving means comprising a magnet which has first and second magnetic polar surfaces, each of these surfaces having adjacent different magnetic poles which generate a magnetic field that is disposed perpendicularly to the magnetic field of the other. The driving means further comprises first and second coils opposing the corresponding first and second magnetic polar surfaces at a predetermined distance. As a result of this, the yoke which is conventionally needed is used in such a manner that the yoke is disposed in an extended manner from a place opposing one magnetic polar portion of the magnet to a place opposing the other magnetic portion. Consequently, a light, compact optical pickup can be provided. Furthermore, since the proportion of the portion of each coil that generates the force for driving the objective lens is large, an efficient optical pickup can be obtained.

What is claimed is:

1. A device for driving optical parts of an optical pickup comprising:
a base;
a holding member movably connected to said base;
an optical element secured to said holding member, said optical element having an optical axis extending in a first direction (F);
a pair of first and second adjacent coils disposed on said holding member; and
magnetic means fixably connected to said base, said magnetic means having first and second magnetic pole surfaces opposing corresponding first and second coils, each of said first and second magnetic pole surfaces being constituted by adjacent different magnetic poles, said adjacent different magnetic poles of said first magnetic pole surface being disposed orthogonally with respect to said adjacent different magnetic poles of said second magnetic pole surface so as to generate a magnetic field that is disposed perpendicularly to the magnetic field of the other magnetic pole surface.

2. The device according to claim 1, wherein said first magnetic pole surface generates a magnetic field in said first direction (F).

3. The device according to claim 2, wherein said second magnetic pole surface generates a magnetic field in a second direction (T) perpendicular to said first direction (F).

4. The device according to claim 3, wherein said first coil is a focusing coil responsive to an electric current to thereby move said optical element in said first direction.

5. The device according to claim 4, wherein said second coil is a tracking coil responsive to an electric current to thereby move said holding member and said optical element in said second direction (T).

6. The device according to claim 5, further comprising;
another pair of first and second coils disposed on a side of said holding member opposite said pair of first and second coils; and
another magnetic means connected to said base opposite said magnetic means, said another magnetic means having first and second magnetic pole surfaces opposing corresponding said first and second coils of said another pair thereof, each of said first and second magnetic pole surfaces being constituted by adjacent magnetic poles, said adjacent magnetic poles of said first magnetic pole surface being oriented orthogonally with respect to said adjacent magnetic poles of said second magnetic pole surface so as to generate a magnetic field that is disposed perpendicularly to the magnetic field of the other magnetic pole surface.

7. The device according to claim 3, further comprising support members connecting said holding member to said base such that said optical element is linearly moveable in said first (F) and second (T) directions.

8. The device according to claim 7, wherein said holding member includes a closed-loop extension extending from a portion thereof holding said first and second coils to define a hollow portion, said pair of first and second coils extending into said hollow portion, and wherein said base includes a recess for receiving said extension, said magnetic means being located within said hollow portion in close proximity and in opposition to said coils.

9. A device for driving optical parts of an optical pickup comprising:
a base having a circular plate;
a holding member including a cylindrical portion;
a pair of first and second adjacent coil means disposed on an outer circumferential portion of said cylindrical portion; and
a magnetic means fixedly connected to said circular plate, said magnetic means having first and second adjacent magnetic pole surfaces opposing corresponding first and second coil means, each of said first and second magnetic pole surfaces being constituted by adjacent different magnetic poles oriented in such a manner that magnetic poles of said first magnetic pole surfaces are different than the adjacent magnetic poles of said second magnetic pole surface so as to generate a magnetic field that is disposed perpendicularly to the magnetic field of the other magnetic pole surface.

10. The device according to claim 9, wherein said first magnetic pole surface generates a magnetic field in said first direction (F).

11. The device according to claim 10, wherein said second magnetic pole surface generates a magnetic field in a second direction (T) perpendicular to said first direction (F).

12. The device according to claim 11, further comprising a connecting means for connecting said holding member to said base such that said optical element is linearly moveable in said first direction (F) upon application of said magnetic field in said first direction and rotatable such that said optical element is moveable in an arcuate direction generally perpendicular to said first direction upon application of said magnetic field in said second direction.

13. The device according to claim 12, wherein said cylindrical portion of said holding member includes an axially extending through hole, and wherein said base includes an axially extending shaft, said shaft extending through said hole, whereby said magnet radially opposes said coil means.

14. The device according to claim 12, further comprising:
another pair of first and second coil means disposed on a side of said holding member opposite said pair of first and second coil means; and
another magnetic means connected to said base opposite said magnetic means, said another magnetic means having first and second magnetic pole surfaces opposing corresponding said first and second coil means of said another pair thereof, each of said first and second magnetic pole surfaces being constituted by adjacent magnetic poles oriented in such a manner that the magnetic poles of said first magnetic pole surface are different than the adjacent poles of said second magnetic pole surface so as to generate a magnetic field that is disposed perpendicularly to the magnetic field of the other magnetic pole surface.

15. The device according to claim 12, wherein said second coil means includes two separate coils.

* * * * *